United States Patent
Cha

(10) Patent No.: US 9,509,562 B2
(45) Date of Patent: Nov. 29, 2016

(54) METHOD OF PROVIDING A DYNAMIC NODE SERVICE AND DEVICE USING THE SAME

(71) Applicant: ELECTRONICS & TELECOMMUNICATIONS RESEARCH INSTITUTE, Daejeon (KR)

(72) Inventor: Gyu Il Cha, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 14/063,044

(22) Filed: Oct. 25, 2013

(65) Prior Publication Data

US 2014/0355478 A1 Dec. 4, 2014

(30) Foreign Application Priority Data

Jun. 4, 2013 (KR) ........................ 10-2013-0063800

(51) Int. Cl.
*H04L 12/28* (2006.01)
*H04L 12/24* (2006.01)
*H04L 12/931* (2013.01)

(52) U.S. Cl.
CPC ........... *H04L 41/0806* (2013.01); *H04L 49/70* (2013.01)

(58) Field of Classification Search
None
See application file for complete search history.

(56) References Cited

U.S. PATENT DOCUMENTS

| 6,779,016 B1 | 8/2004 | Aziz et al. |
| 2002/0194407 A1 | 12/2002 | Kim |
| 2004/0019891 A1* | 1/2004 | Koenen ................. G06F 9/5044 718/102 |
| 2008/0209099 A1 | 8/2008 | Kloeppner et al. |
| 2010/0153592 A1* | 6/2010 | Freimuth ............ G06F 13/4022 710/38 |
| 2014/0006549 A1* | 1/2014 | Narayanaswamy .. H04L 67/327 709/217 |

FOREIGN PATENT DOCUMENTS

KR 1020100067601 A 6/2010

* cited by examiner

*Primary Examiner* — Yemane Mesfin
*Assistant Examiner* — Jeff Banthrongsack
(74) *Attorney, Agent, or Firm* — Ladas & Parry LLP

(57) ABSTRACT

There are provided a method of providing a dynamic node service and a device using the same. The method of providing a dynamic node service that is operated in a fabric controller includes receiving a dynamic node service request, selecting a plurality of system resources including at least one processing unit from among system resources connected with a fabric switch corresponding to the dynamic node service request, and configuring a dynamic node by connecting the plurality of selected system resources to each other through control of the fabric switch. Therefore, it is possible to provide the dynamic node having performance satisfying a user's request.

11 Claims, 5 Drawing Sheets

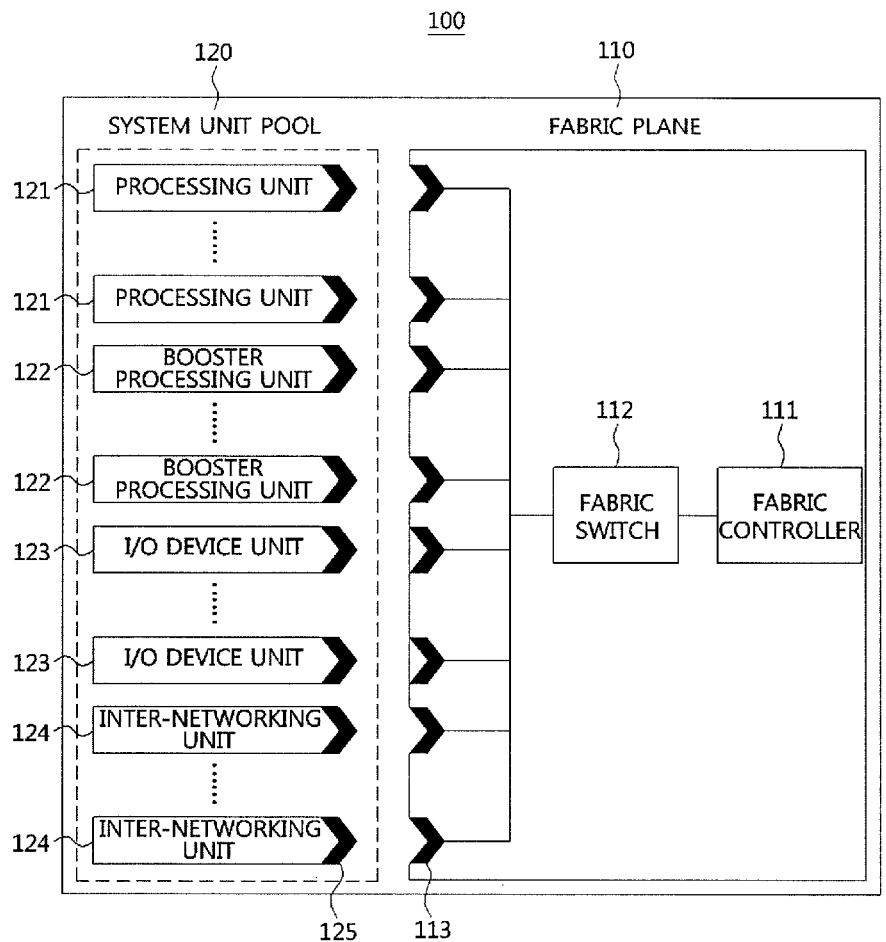
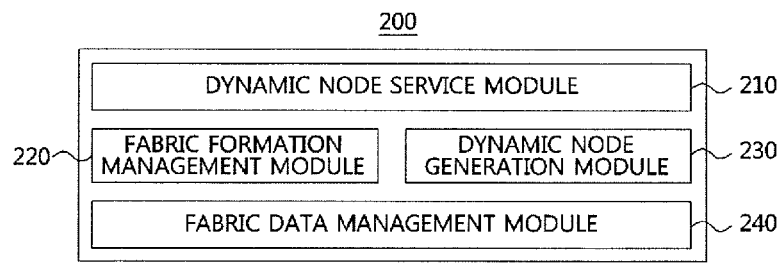

METHOD OF PROVIDING A DYNAMIC NODE SERVICE AND DEVICE USING THE SAME

CLAIM FOR PRIORITY

This application claims priority to Korean Patent Application No. 10-2013-0063800 filed on Jun. 4, 2013 in the Korean Intellectual Property Office (KIPO), the entire contents of which are hereby incorporated by reference.

BACKGROUND

1. Technical Field

Example embodiments of the present invention relate to a method of providing a dynamic node service and a device using the same, and more specifically, to a method of providing a dynamic node service corresponding a node request scale from a user and a device using the same.

2. Related Art

Existing technology as a background to the invention includes server consolidation virtualization software technology and cloud computing technology.

The server consolidation virtualization software technology is used for building a shared memory multi-threading system environment that provides shared memory services for data-centered processing and high-performance multi-threading services for computation-centered processing.

Server consolidated virtualization technology can be classified under two approaches according to a method of building a large scale abstract consolidation server by connecting independent small scale shared memory multi-threading nodes.

One approach is a physical node connecting method based on hardware (for example, NumaConnect of NumaScale). In this method, it is possible to build a large scale consolidation server without changing software technological aspects from existing small scale nodes but it has a node scalability problem due to high dependency on a system connection network.

The other approach is a method in which each node of a multi-node system is integrated and is virtualized as single abstract hardware, and a single system image is driven in a virtual system (for example, vSMP Foundation of ScaleMP). This method provides the same system view as an existing one by integration and virtualization resources of multi-nodes but it has a limitation of system scalability due to an increased virtualization load.

A common problem of node scalability has been pointed out in the above two approaches, and thus these have been evaluated as appropriate technology for building and operating a high-performance shared memory multi-threading system managed as a single point over small and medium scale nodes, but to have low efficiency due to an increased scalability load and inconvenience in usage due to an integrated operation with a distributed computing environment. In addition, the two approaches use technology for connecting existing commercial nodes using hardware or software and include unnecessary I/O resources in addition to essential resources such as processing resources. As a result, complexity of system operations increases and building costs increase.

Existing cloud computing technology abstracts a multi-node system as a platform as a service (PaaS) computing platform based on a divided virtualization layer, and then provides the user with a virtual node service having a variable size within a limitation of physical nodes.

This approach provides the user with decreased costs of system building and maintenance. However, a scale of virtual nodes that can be provided has the same limitations as a basic physical node and a resource operating method is completely dependent on the divided virtualization layer.

SUMMARY

Accordingly, example embodiments of the present invention are provided to substantially obviate one or more problems due to limitations and disadvantages of the related art.

Example embodiments of the present invention provide a rack-based system operating environment, a method using the same and a method of providing a dynamic node service based on the environment such that, by admitting technological limitations of node scalability of server consolidated virtualization technology, a technology operating range of a high-performance shared memory multi-threading node through consolidated virtualization technology is limited to a rack-scale level, unnecessary resource waste that can occur when an existing commercial system is used as a unit node is prevented, and a dynamic request for nodes having a variety of sizes from a user is flexibly provided.

Example embodiments of the present invention also provide a device for providing a dynamic node service using the above-described method.

In some example embodiments, a method of providing a dynamic node service that is operated in a fabric controller, includes receiving a dynamic node service request, selecting a plurality of system resources including at least one processing unit from among system resources connected with a fabric switch corresponding to the dynamic node service request, and configuring a dynamic node by connecting the plurality of selected system resources to each other through control of the fabric switch.

In the receiving of the dynamic node service request, the dynamic node service request including information on a dynamic node configuration may be received.

In the configuring of the dynamic node, an execution cell including at least one processing unit may be configured by connecting the plurality of selected system resources with the fabric switch.

In the configuring of the dynamic node, the dynamic node may be configured by loading an aggregation virtualization module in an upper layer of the execution cell.

The configuring of the dynamic node may include configuring an execution cell cluster by connecting the execution cells to each other using the fabric switch when the number of configured execution cells is two or more, and configuring the dynamic node in units of dynamic clusters by loading an aggregation virtualization module in the execution cell cluster.

In other example embodiments, a device for providing a dynamic node service includes a plurality of system resources including at least one processing unit resource, a fabric switch configured to connect selected system resources corresponding to a provided switching control signal, and a fabric controller configured to select system resources corresponding to a provided dynamic node service request from among the plurality of system resources and provide the switching control signal to connect the selected system resources.

The fabric controller may configure a dynamic node corresponding to the received dynamic node service request and transfer control over the configured dynamic node.

The fabric controller may configure an execution cell by building a communication network with the fabric switch corresponding to information on a configuration of the requested dynamic node.

The fabric controller may manage switching information and operation information of the fabric switch.

The fabric controller may configure a dynamic node by loading an aggregation virtualization module in the execution cell.

The fabric controller may configure the execution cells as an execution cell cluster using the fabric switch when the number of configured execution cells is two or more.

The fabric controller may configure the dynamic node by loading an aggregation virtualization module in the execution cell cluster.

Each of the system resources may include a communication function for performing communication with another system resource.

The system resources may include at least one resource of a processing unit, a booster processing unit, an I/O device unit, and an inter-networking unit and the processing unit resource may include a central processing unit and a memory.

BRIEF DESCRIPTION OF DRAWINGS

Example embodiments of the present invention will become more apparent by describing in detail example embodiments of the present invention with reference to the accompanying drawings, in which:

FIG. 1 is a block diagram illustrating a rack-scale fabric system in a device for providing a dynamic node service according to an embodiment of the present invention.

FIG. 2 is a block diagram illustrating a system fabric dynamic manager that performs operations in a fabric controller of the device for providing a dynamic node service according to the embodiment of the present invention.

DESCRIPTION OF EXAMPLE EMBODIMENTS

Figure 3:
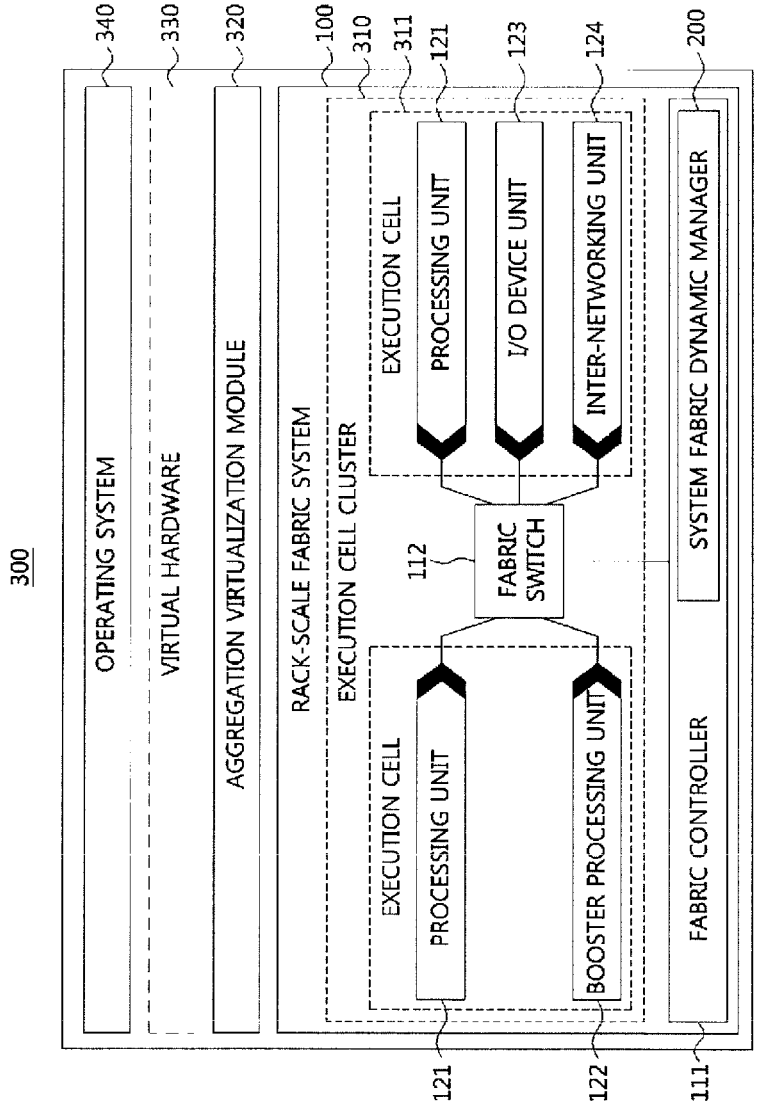
FIG. 3 is a block diagram illustrating a configuration in which one dynamic node is configured in the device for providing a dynamic node service according to the embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. In order to facilitate overall understanding of the invention, like reference numerals in the drawings denote like elements, and thus the description thereof will not be repeated.

FIG. 1 is a block diagram illustrating a rack-scale fabric system in a device for providing a dynamic node service according to an embodiment of the present invention.

The device for providing a dynamic node service that provides a dynamic node service will be described in detail with reference to FIG. 1.

As illustrated in FIG. 1, a rack-scale fabric system 100 may include a fabric plane 110 configured to control system resource units to be physically connected to operate as an execution cell or an execution cell cluster and a system unit pool 120 which is a set of independent system resource units configuring the execution cell.

The fabric plane 110 operates as a back plane that provides a system bus network among main resource units 121, 122, 123, and 124 of the system unit pool 120, and an internal interconnection network service between execution cells of the rack-scale fabric system 100 using fabric switch network technology, for example, peripheral component interconnect express (PCI-express) technology.

A fabric controller 111 may dynamically connect a processing unit 121 and the other system resource units 122, 123, and 124 to configure them as the execution cell or the execution cell cluster, and configure a dynamic node by virtualization.

A fabric switch 112 is a system network switch controlled by the fabric controller 111 in the system fabric plane 110, and connects the system resource units 121, 122, 123, and 124 to configure a system bus network in the execution cell or operates as an internal connection network of the execution cell cluster.

Here, for example, a PCI express switch may be used as the fabric switch.

A fabric connector 113 of the fabric plane 110 provides an interface for interconnecting the system resource units 121, 122, 123, and 124 controlled by the fabric controller.

The system resource units 121, 122, 123, and 124 of the system unit pool 120 may be configured as an independent individual system having relatively smaller scale performance than existing nodes in order to minimize unnecessary usage of resources when the execution cell is configured.

The main resource unit may be, for example, a processing unit 121, a booster processing unit 122, an I/O device unit 123, or an inter-networking unit 124.

Moreover, the system resource units 121, 122, 123, and 124 may include their own communication function for communication with other system resource units and each system resource unit may include a fabric connector 125 for providing a connection with the fabric connector 113 of the fabric plane 110.

The processing unit 121 is implemented in a form in which central processing unit resources and memory resources are combined in order to provide performance benefits and is used as an essential unit that allows the execution cell 311 to be operated as an independent environment.

For processing of the central processing unit included in the processing unit 121, a processor that can increase resource utilization efficiency and for which additional divided virtualization technology is not necessary, for example, an ARM processor, may be used. By implementing the processing unit 121 in such a way, it is possible to configure the execution cell 311 having minimum performance with a high resource utilization rate.

The booster processing unit 122 configured to boost a processing function by assisting the processing unit 121, an I/O device unit 123 configured to connect an I/O device, and an inter-networking unit 124 for communication with external nodes, which are not operated independently on the execution cell formation but are operated dependently on the processing unit 121.

However, the booster processing unit 122 included in the system unit pool 120 may be configured to be operated as an independent environment according to an implementation method.

FIG. 2 is a block diagram illustrating a system fabric dynamic manager that performs operations in the fabric controller of the device for providing a dynamic node service according to the embodiment of the present invention.

In FIG. 2, a system fabric dynamic manager that controls the rack-scale fabric system 100, configures the execution cell 311 in FIG. 3, finally provides a dynamic node service, and is operated in the fabric controller will be described in detail.

Main components configuring the system fabric dynamic manager 200 in FIG. 2 may include a dynamic node service module 210, a fabric formation management module 220, a dynamic node generation module 230, and a fabric data management module 240.

Here, the dynamic node service module, the fabric formation management module, the dynamic node generation module, and the fabric data management module are used to describe operation concepts of the system fabric dynamic manager 200 that is operated in the fabric controller 111 and an implementation method of the system fabric dynamic manager is not limited thereto.

The system fabric dynamic manager 200 may provide a dynamic node service such that an operation starts in the fabric controller 111 with power supply of the rack-scale fabric system 100, the system unit pool 120 and a fabric switch network are managed, required units according to a user's request are selected from the system unit pool 120, the execution cell 311 or the execution cell cluster 310 in FIG. 3 is configured, and finally, the dynamic node is returned to the user.

The dynamic node service module 210 receives a dynamic node service request including dynamic node scale information from the outside, requests processing for providing a dynamic node usage service corresponding to the requested scale information from the fabric formation management module 220, and provides control over the generated dynamic node to the user.

The fabric formation management module 220 controls a configuration of the execution cell 311 or the execution cell cluster 310, and requests processing for generating the dynamic node 300 based on the configured execution cell 311 or execution cell cluster 310 from the dynamic node generation module 230.

The dynamic node generation module 230 may load an aggregation virtualization module 320 in FIG. 3 in an upper layer of the execution cell 311 or the execution cell cluster 310 generated by the fabric formation management module 220, abstract the module as virtual hardware 330, and then finally generate the dynamic node 300.

The fabric data management module 240 may manage, for example, connection formation data between resource units of the rack-scale fabric system 100, switching information, and software operation information of the system fabric dynamic manager 200.

FIG. 3 is a block diagram illustrating a configuration in which one dynamic node is configured in the device for providing a dynamic node service according to the embodiment of the present invention.

A configuration block of the dynamic node associated with generation of the dynamic node 300 will be described with reference to FIG. 3.

The system fabric dynamic manager 200 in the fabric controller 111 selects the resource unit in the rack-scale fabric system 100, and then configures the unit as the execution cell 311 or the execution cell cluster 310, and applies virtualization technology to the upper layer of the execution cell 311 or the execution cell cluster 310, and the dynamic node 300 is thereby generated.

The system fabric dynamic manager 200 in the fabric controller 111 may generate the execution cell 311 in which the one processing unit 121 is included, and connect the plurality of execution cells 311 of the smallest unit according to a request scale of the dynamic node that is requested to configure the execution cell cluster 310.

Here, when the system fabric dynamic manager 200 in the fabric controller 111 processes a large scale dynamic node generation request, in order to efficiently operate system resources and efficiently manage processing tasks by better reflecting localization properties in data processing, the execution cell 311 may be configured on a small scale in which only one processing unit 121 is included and the plurality of execution cells 311 may be connected via the fabric switch network to configure the execution cell cluster 310.

The aggregation virtualization module 320 is software for applying virtualization technology to the execution cell 311 or the execution cell cluster 310 to abstract the cell or the cluster as the virtual hardware 330.

Here, in order to efficiently perform processing tasks by better reflecting localization properties in data processing, the aggregation virtualization module 320 abstracts the virtual hardware 330 to have a non-uniform memory access (NUMA) structure such that an operating system 340 differently manages data processing costs between the execution cell 311 and another execution cell 311 in the execution cell cluster 310.

The virtual hardware 330 is hardware having the NUMA structure abstracted by the aggregation virtualization module 320 and the operating system is installed and operated in this layer.

Figure 4:
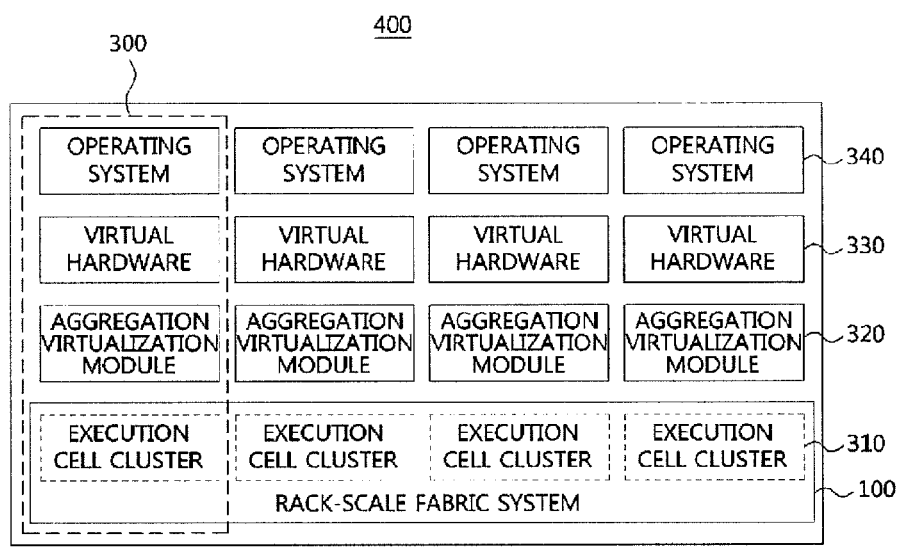
FIG. 4 is a block diagram illustrating a configuration in which a plurality of dynamic nodes are configured in a single rack-scale fabric system in the device for providing a dynamic node service according to the embodiment of the present invention.

FIG. 4 is a block diagram illustrating a configuration in which the plurality of dynamic nodes are configured in a single rack-scale fabric system in the device for providing a dynamic node service according to the embodiment of the present invention.

As illustrated in FIG. 4, the plurality of dynamic nodes are configured in the single rack-scale fabric system according to a user's request.

According to the user's request, the system fabric dynamic manager 200 in the fabric controller 111 may use the system resource units of the rack-scale fabric system to configure the execution cell or the execution cell cluster as the dynamic node. According to the user's dynamic node request scale and a scale of the rack-scale fabric system, the plurality of dynamic nodes may be configured in the single rack-scale fabric system.

Figure 5:
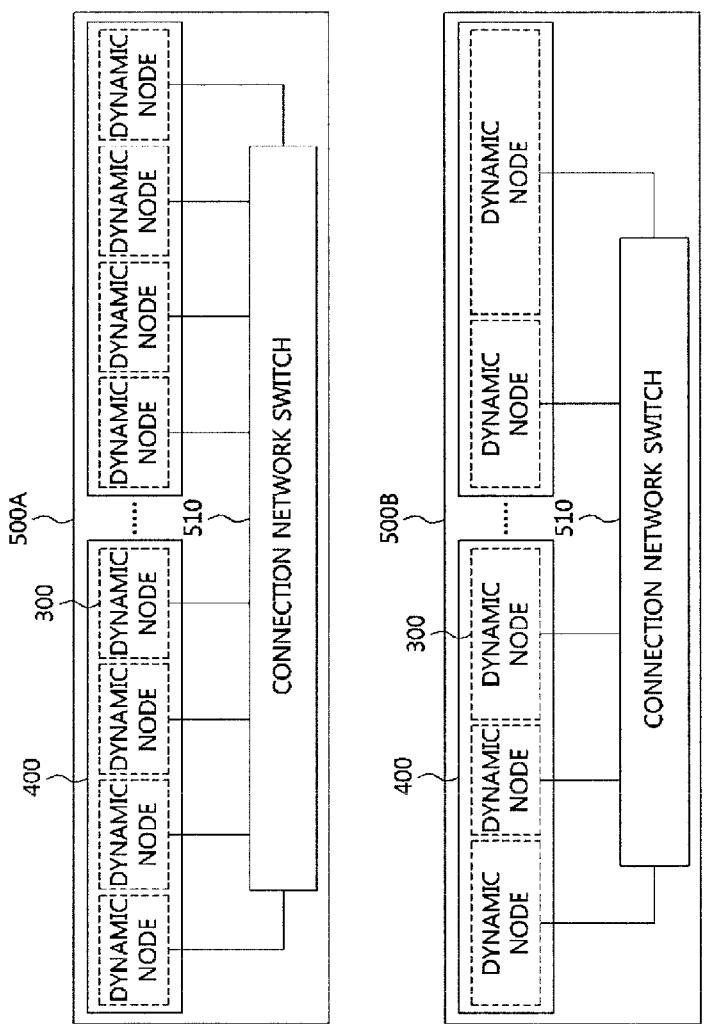
FIG. 5 is a block diagram illustrating a scalable dynamic cluster in the device for providing a dynamic node service according to the embodiment of the present invention.

FIG. 5 is a block diagram illustrating a scalable dynamic cluster configured by connecting the plurality of dynamic nodes with an external communication network in the device for providing a dynamic node service according to the embodiment of the present invention.

As illustrated in FIG. 5, an isomorphic dynamic cluster 500a is an illustration of a form of an existing general cluster system in which a system formation and a scale of the dynamic node 300 used for building a cluster having the same type.

A heteromorphic dynamic cluster 500b is an illustration of a cluster system in which a system formation and a scale of the dynamic node 300 used for building a cluster have different types and in which a form efficient for simultaneously operating various tasks having different resource scales necessary for task executions is configured.

The device for providing a dynamic node service according to the invention may configure the dynamic node having various configurations using the rack-scale fabric system according to the user's request and configure the isomorphic dynamic cluster or the heteromorphic dynamic cluster using the configured dynamic node.

Figure 6:
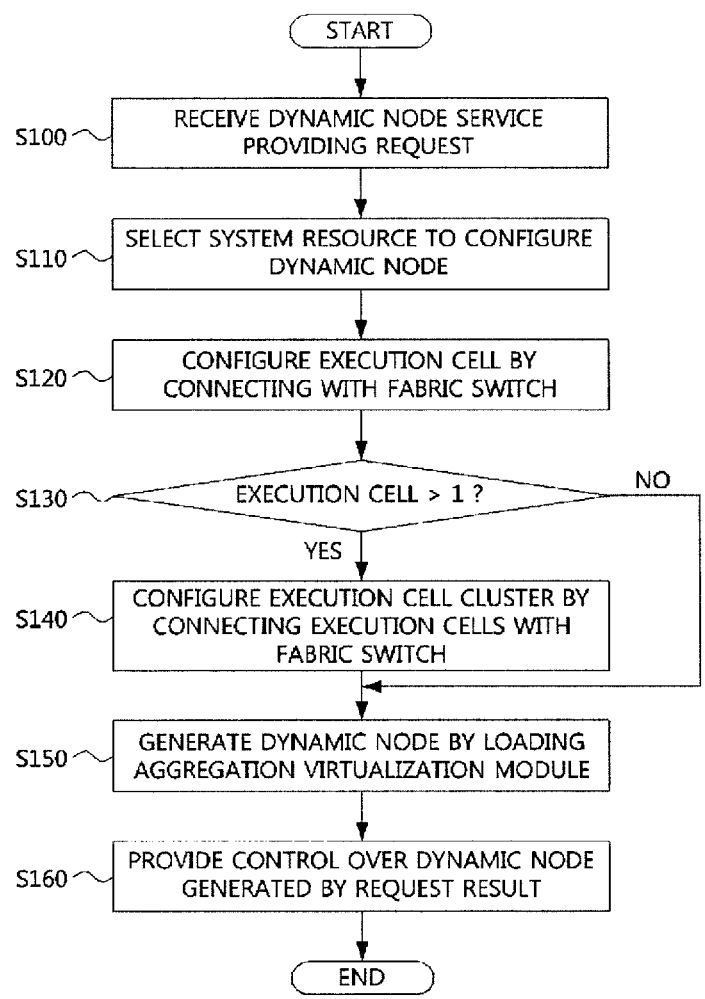
FIG. 6 is a flowchart illustrating a method of providing a dynamic node service according to another embodiment of the present invention.

FIG. 6 is a flowchart illustrating a method of providing a dynamic node service according to another embodiment of the present invention.

The fabric controller 111 receives a dynamic node service providing request from the outside (S100).

Here, the dynamic node service providing request may include node scale information of the dynamic node 300.

Moreover, reception of the dynamic node service providing request may be processed in the dynamic node service module 210 of the system dynamic manager 200.

The fabric controller 111 selects a required system resource unit from a system unit pool 120 in order to configure a system corresponding to the dynamic node 300 based on the received information (S110).

Here, the selected system resource unit includes at least one processing unit 121 according to a scale of the requested dynamic node 300.

Here, the number of execution cells 311 may be determined corresponding to the number of selected processing units 121.

Moreover, the selection of the system resource unit may be processed in the fabric formation management module 220.

The fabric controller 111 connects the selected resources units 121, 122, 123, and 124 via the fabric switch network and configures the execution cell 311 (S120).

Here, the configuration of the execution cell 311 may be processed in the fabric formation management module 220.

The fabric controller 111 determines the number of configured execution cells 311 (S130).

When the number of execution cells 311 configured by the fabric controller 111 is two or more, the configured execution cells 311 are configured as one execution cell cluster 310 using the fabric switch network as the internal connection network (S140).

Here, determination of the number of execution cells 311 and the configuration of the execution cell cluster 310 may be processed in the fabric formation management module 220.

The fabric controller 111 loads the aggregation virtualization module 320 in the upper layer of the execution cell 311 or the execution cell cluster 310, abstracts the module as one piece of virtual hardware 330, and installs a required operating system 340 in the virtual hardware 330 (S150).

Here, processes of loading the aggregation virtualization module 320, generating the virtual hardware 330, and installing the operating system 340 may be operated in the dynamic node generation module 230.

The fabric controller 111 transfers control over the generated dynamic node to the user who has requested the dynamic node or an external device so that the dynamic node usage service is provided (S160).

According to the method of providing a dynamic node service and the device using the same, unlike other methods in which only existing server consolidated virtualization technology is applied, it is possible to effectively integrate processing resources (for example, central processing unit resources and memory resources) into a node. Moreover, additional system resources (for example, I/O resources, communication resources, and processing booster resources) that are rarely required for a system configuration are selectively included so that it is possible to effectively decrease a management load necessary for a configuration and an operation of nodes.

Moreover, unlike an existing virtualization service only for nodes having a fixed standard and performance, since system resource units having relatively small scale performance are dynamically combined as necessary, and used as a basic execution cell to be applied to virtualization technology, it is possible to configure the smallest node for which divided virtualization is unnecessary. Such smallest execution cells are connected and consolidated virtualization technology is applied, thereby providing the dynamic node having large scale performance satisfying a user's request.

Further, according to the method of providing a dynamic node service and the device using the same described above, unlike an existing data center configured with equal physical nodes, it is possible to easily build a data center that can effectively provide a dynamic node matching a system size designated by the user, and delay an operating time point of the system resource unit to a time point of providing an actual dynamic node service. Therefore, it is possible to significantly decrease operating costs (for example, power consumption costs and system maintenance and management costs) of a large scale data center.

Moreover, it is possible to build a flexible cluster system based on an isomorphic or to heteromorphic node necessary for operating the large scale data center using the rack-based dynamic node service device.

While the example embodiments of the present invention and their advantages have been described in detail, it should be understood that various changes, substitutions and alterations may be made herein without departing from the scope of the invention as defined by the following claims.

What is claimed is:

1. A method of providing a dynamic node service that is operated in a fabric plane, the method comprising:
   receiving a dynamic node service request;
   selecting a plurality of system resources including at least one processing unit from among system resources connected with a fabric switch corresponding to the dynamic node service request; and
   configuring a dynamic node by connecting the plurality of selected system resources to each other through control of the fabric switch by a fabric controller,
   wherein in the configuring of the dynamic node, an execution cell including at least one processing unit is configured by connecting the plurality of selected system resources with the fabric switch,
   wherein the configuring of the dynamic node includes:
   configuring an execution cell cluster by connecting the execution cells to each other using the fabric switch when the number of configured execution cells is two or more; and
   configuring the dynamic node in units of dynamic clusters by loading an aggregation virtualization module in the execution cell cluster.

2. The method of claim 1, wherein, in the receiving of the dynamic node service request, the dynamic node service request including information on a dynamic node configuration is received.

3. The method of claim 1, wherein, in the configuring of the dynamic node, the dynamic node is configured by loading an aggregation virtualization module in an upper layer of the execution cell.

4. A device for providing a dynamic node service comprising:
   a plurality of system resources including at least one processing unit resource; and
   a fabric switch controlled by a fabric controller and configured to connect selected system resources from the plurality of system resources corresponding to a provided switching control signal;
   wherein the fabric controller is configured to select system resources corresponding to a provided dynamic node service request from among the plurality of system resources and provide the switching control signal to connect the selected system resources,
   wherein the fabric controller configures an execution cell by building a communication network with the fabric switch corresponding to information on a configuration of the requested dynamic node,
   wherein the fabric controller configures the execution cells as an execution cell cluster using the fabric switch when the number of configured execution cells is two or more, and
   wherein the fabric controller configures the execution cells as an execution cell cluster using the fabric switch when the number of configured execution cells is two or more.

5. The device of claim 4, wherein the fabric controller configures a dynamic node corresponding to the received dynamic node service request and transfers control over the configured dynamic node.

6. The device of claim 4, wherein the fabric controller manages switching information and operation information of the fabric switch.

7. The device of claim 4, wherein the fabric controller configures a dynamic node by loading an aggregation virtualization module in the execution cell.

8. The device of claim 4, wherein each of the system resources includes a communication function for performing communication with another system resource.

9. The device of claim 4, wherein the system resources include at least one resource of a processing unit, a booster processing unit, an I/O device unit, and an inter-networking unit, and the processing unit resource includes a central processing unit and a memory.

10. The device of claim 4, wherein the fabric controller comprises a system fabric dynamic manager, which further comprises:
    a dynamic node service module;
    a fabric formation management module;
    a dynamic node generation module; and
    a fabric data management module.

11. A method of providing a dynamic node service that is operated in a fabric plane, the method comprising:
    receiving a dynamic node service request;
    selecting a plurality of system resources including at least one processing unit from among system resources connected with a fabric switch corresponding to the dynamic node service request;
    configuring an execution cell including at least one processing unit is configured by connecting the plurality of selected system resources with the fabric switch controlled by a fabric controller;
    configuring an execution cell duster by connecting a plurality of execution cells with the fabric switch;
    generating the dynamic mode by loading an aggregation virtualization module in an upper layer of the execution cell; and
    providing control over the dynamic mode generated by the dynamic node service request.

* * * * *